United States Patent

Kraus

[11] 4,224,840
[45] Sep. 30, 1980

[54] TRACTION ROLLER TRANSMISSION

[75] Inventor: Charles E. Kraus, Austin, Tex.

[73] Assignee: Excelermatic Inc., Austin, Tex.

[21] Appl. No.: 902,716

[22] Filed: May 4, 1978

[51] Int. Cl.[2] .................. F16H 13/06; F16H 15/00; F16H 13/02
[52] U.S. Cl. ........................ 74/798; 74/204; 74/206; 74/208; 74/209
[58] Field of Search .............. 74/798, 202, 204, 206, 74/208, 209

[56] References Cited

U.S. PATENT DOCUMENTS

| 661,909 | 11/1900 | Foster | 74/208 |
|---|---|---|---|
| 1,093,922 | 4/1914 | Dieterich | 74/206 |
| 1,291,654 | 1/1919 | Morison | 74/206 |
| 1,737,695 | 12/1929 | Zadow | 74/206 |
| 2,704,459 | 3/1955 | Nanni | 74/798 X |
| 3,160,031 | 12/1964 | Bugg | 74/798 |
| 3,364,761 | 1/1968 | Nasvytis | 74/798 |
| 3,433,099 | 3/1969 | Nasvytis | 74/208 |
| 3,889,554 | 6/1975 | Sinclair | 74/798 X |
| 4,052,915 | 10/1977 | Kraus | 74/798 |
| 4,121,331 | 10/1978 | Fukuma et al. | 74/798 X |
| 4,128,016 | 12/1978 | Nasvytis | 74/798 |

FOREIGN PATENT DOCUMENTS

| 413518 | 5/1925 | Fed. Rep. of Germany | 74/798 |
|---|---|---|---|
| 14673 | 5/1926 | Fed. Rep. of Germany | 74/798 |
| 665767 | 10/1938 | Fed. Rep. of Germany | 74/798 |
| 1194176 | 11/1949 | France | 74/206 |
| 86680 | 6/1936 | Sweden | 74/798 |
| 117878 | 3/1923 | United Kingdom | 74/209 |
| 269904 | 4/1927 | United Kingdom | 74/798 |

OTHER PUBLICATIONS

"Mechanical Design and Systems" pp. 14-8 and 14-9, McGraw Hill, New York, 1964.

Primary Examiner—Leslie Braun
Attorney, Agent, or Firm—Klaus J. Bach

[57] ABSTRACT

A traction roller transmission comprising coaxial input and output shafts with a sun roller associated with one and a traction ring surrounding the sun roller associated with the other shaft and traction transmitting roller casters disposed in the annular space between, and in engagement with, the sun roller and the traction ring for the transmission of motion therebetween. Each roller caster includes two transmission rollers whose combined diameters are slightly larger than the gap between the sun roller and the traction ring, one of the transmission rollers being in engagement with the sun roller and the other with the traction ring such that a torque transmitted through the transmission tends to pivot the casters, which are slightly tilted, into a more upright position with respect to the sun roller and traction ring surfaces thereby forcing the transmission rollers into firm engagement with each other and with the traction ring and the sun roller. The casters have a pivotal support disposed in front of them, with respect to their direction of movement relative to the traction ring and sun roller, which both rotate in the same direction, so that the casters swing into perfect parallel alignment with the axis of the sun roller and the traction ring.

8 Claims, 4 Drawing Figures

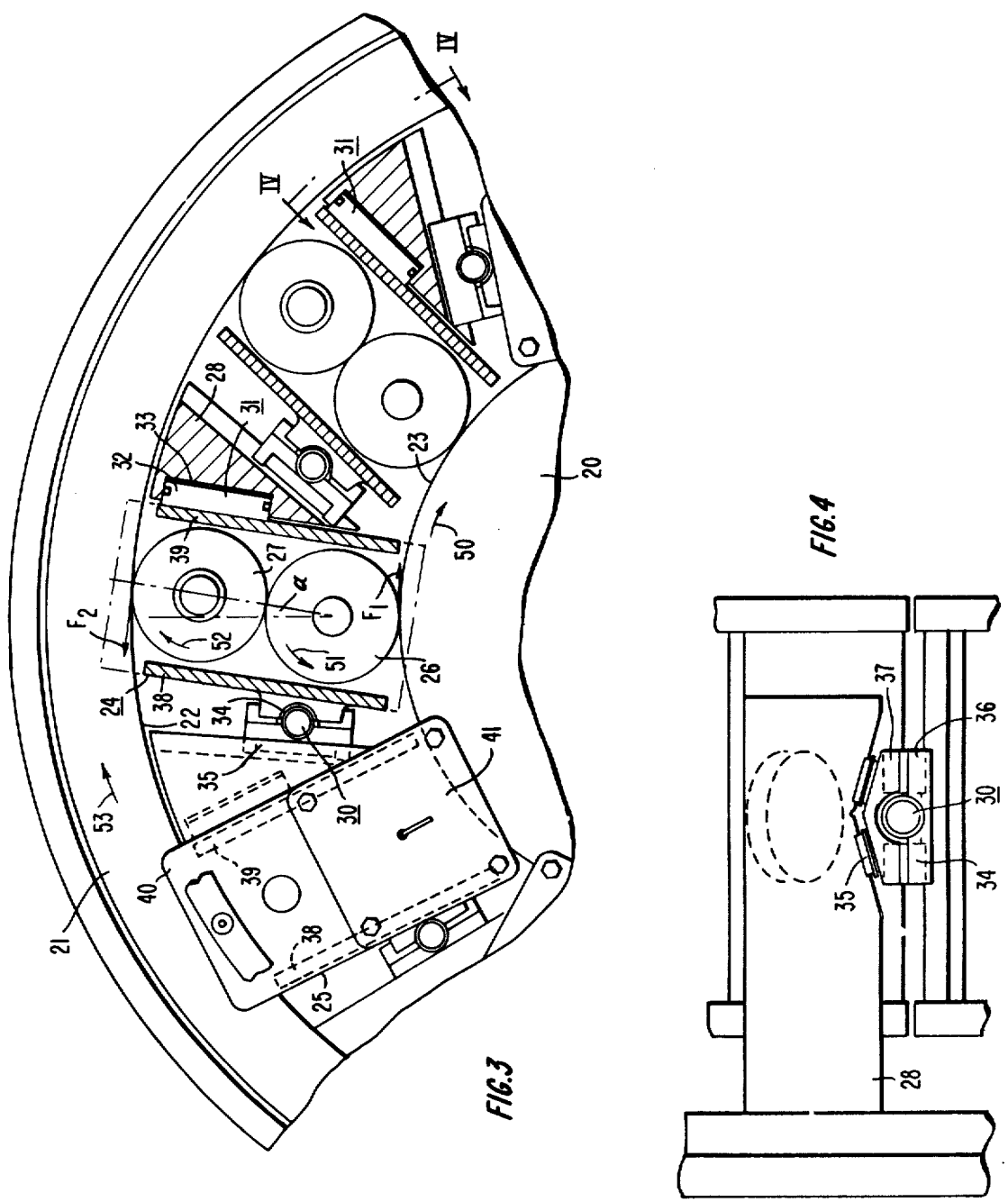

TRACTION ROLLER TRANSMISSION

BACKGROUND OF THE INVENTION

1. Field of the Invention

The invention relates to fixed-ratio traction roller transmissions in which the contact forces applied to the traction surfaces, which are in contact with one another for the transmission of movement, are dependent on the torque transmitted through the transmission.

2. Description of the Prior Art

Traction roller transmissions require large contact forces for the frictional engagement of their motion transmitting rollers in order to prevent slippage. However, the required contact forces vary with the amount of torque transmitted through the transmission. In the "Mechanical Design And Systems" handbook, pages 14-8 and 14-9, McGraw-Hill, New York, 1964, a planetary type traction roller transmission is described in which, in the simple arrangement of FIGS. 14.6 and 14.7, the outer ring surrounding the sun and the planetary rollers is slightly undersized so as to compress and force the traction rollers and the sun into frictional engagement with each other. With this arrangement however, the pressure on the traction surfaces is always the same, that is, it is always high independently of the torque transmitted through the transmission.

There are also traction roller transmissions in which the contact forces applied to the traction rollers are variable and depend on the torque transmitted through the transmission. Applicants earlier, U.S. Pat. No. 4,052,915, for example, has a number of traction rollers disposed in an annular space formed between a sun roller and slightly conical traction rings so mounted in the transmission housing that a torque transmitted through the transmission forces the traction rings toward each other for engagement of the traction rollers with the ring and the sun roller.

In all these arrangements however, the sun roller and the ring rotate in opposite directions relative to the movement of the planetary roller axes and, accordingly, special provisions are required to maintain the planetary roller axes in exact parallel alignment with the axes of the traction rings and of the sun roller. Furthermore, as the traction ring will always rotate in a direction opposite to the direction of rotation of the sun roller assuming that the "planetary" rollers are only permitted to rotate about their own axes, an output shaft connected to the traction rings will always rotate in a direction opposite to that of an input shaft connected to the sun roller. Rotation of the input and output shafts in opposite directions however, is sometimes undesirable and the transmission support structure requires heavy mounts capable of assuming the full reaction torque of the output shaft.

SUMMARY OF THE INVENTION

In a fixed ratio traction roller transmission a power transmitting traction roller structure is disposed in the annular space between a traction ring and a sun roller disposed centrally within the traction ring. The traction roller structure consists of a number of roller casters each having two rollers disposed adjacent each other, one in engagement with the sun roller and the other in engagement with the traction ring. The combined diameter of the two rollers in each caster is slightly larger than the gap between the sun roller and the traction ring and the casters are pivotally supported by a pivotal support structure such that a torque transmitted through the transmission rollers forces the casters into a more upright position with respect to the surfaces of the sun roller and the traction ring and into firm frictional engagement with each other and with the traction ring and the sun roller.

The casters are also tiltably supported by the pivotal support structure which is arranged, with respect to the direction of rotation of the sun roller and the traction ring, in front of the roller casters such that the roller casters are trailing the pivotal support structure and align themselves with the axis of the traction ring and the sun roller.

BRIEF DESCRIPTION OF THE DRAWINGS

The invention will become more readily apparent from the following description of preferred embodiments thereof shown, by way of example only, in the accompanying drawings, in which:

FIG. 3 shows a more elaborate support structure for the roller block; and

FIG. 4 is a cross-sectional view along lines IV—IV of FIG. 3.

DESCRIPTION OF THE PREFERRED EMBODIMENTS

Figure 1:
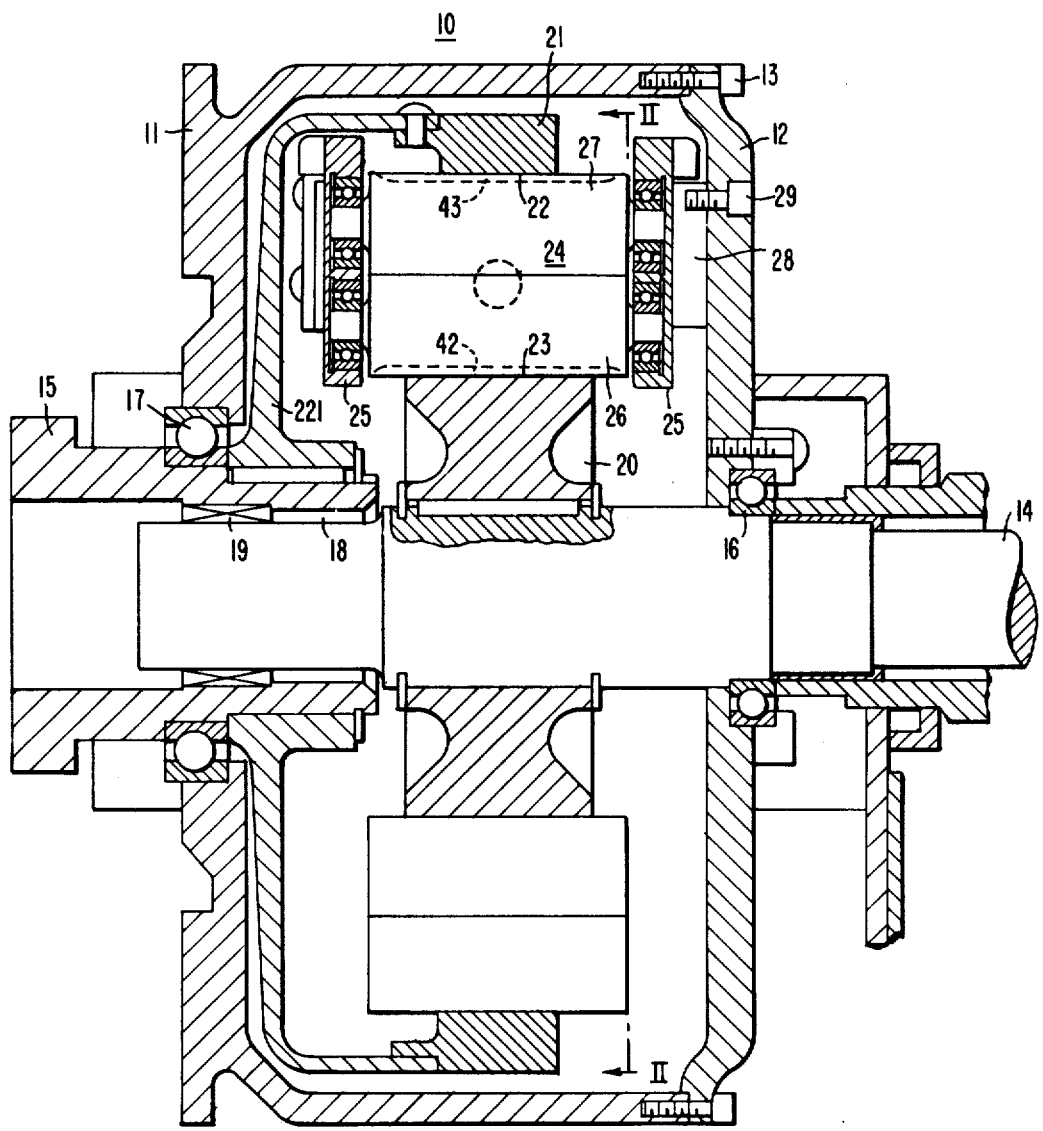
FIG. 1 is a cross-sectional view of the traction roller transmission showing the general arrangement of its elements.

As shown in FIG. 1, the traction roller transmission comprises a housing 10 having a main part 11 and a cover 12 mounted on the housing part 11 by bolts 13. Coaxial input and output shafts 14 and 15 are rotatably supported in the housing cover 12 and the main housing part 11 by bearings 16 and 17. The input shaft 14 extends into a bore 18 in the output shaft 15 and is supported therein by a roller bearing 19. The input shaft 14 carries a sun roller 20 and the output shaft 15 has a traction ring 21 connected thereto by a bell structure 221. The traction ring 21 is concentric with the sun roller 20 with its inner traction surface 22 being radially spaced from the traction surface 23 of the sun roller 20 and a number of roller casters 24 are arranged in the annular space 251 (FIG. 2) between the sun roller 20 and the traction ring 21. Each roller caster 24 consists of a caster frame 25 supporting two parallel and adjacent transmission rollers 26 and 27 which are in engagement with each other and of which one (26) is in engagement with the sun roller 20 and the other (27) is in engagement with the traction ring 21.

For supporting the roller casters 24, the housing 10, that is housing cover 12, has support blocks 28 mounted thereon by bolts 29 and projecting into the spaces between the roller casters 24. Each support block 28 is provided at one side with a ball pivot structure 30 for abutment by the adjacent roller caster and, at the opposite side, means 31 are provided adjacent the radially outer end of the support block for tilting the roller caster adjacent the opposite side about its pivot structure 30. The sum of the diameters of the two rollers 26 and 27 in each roller caster 24 is slightly larger than the radial dimension of the space between the sun roller's traction surface 23 and the traction ring's inner surface 22 and the roller casters 24 are all slightly tilted such that a plane receiving the axes of the rollers 26 and 27 of a caster 24 intersects a plane receiving the axes of the sun roller 20 and the adjacent roller 26 of a roller caster 24 at an angle α. Tilting the casters 24 in such a way that the angle α becomes smaller forces the caster rollers 26 and 27 into frictional engagement with each other and with the traction surfaces 22 and 23 of the traction ring 21 and the sun roller 20 for the transmission of motion between the sun roller 20 and the traction ring 21.

Figure 2:
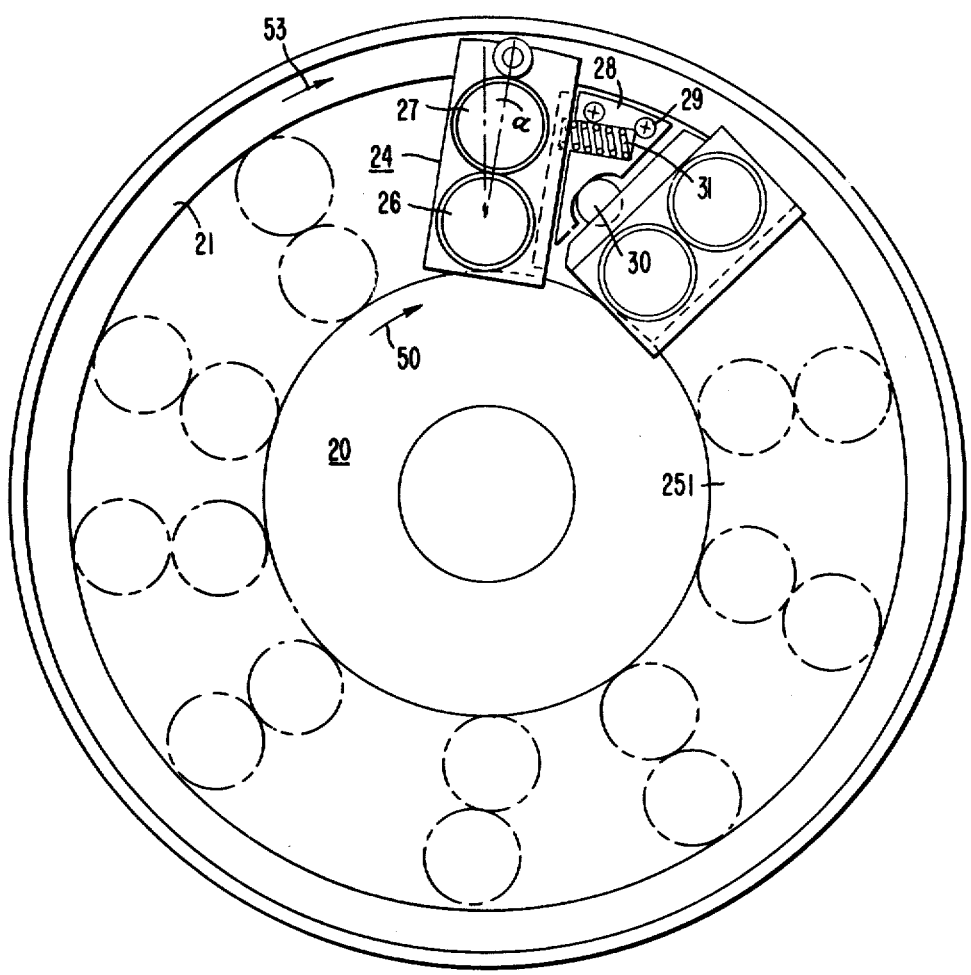
FIG. 2 is a cross-sectional view along lines II—II of FIG. 1 showing the arrangement of the roller blocks without the housing.

The means 31 for tilting the roller caster 24 is shown schematically in FIG. 2 as being a coil spring. Preferably, however, as shown in FIG. 3, the tilting means 31 consists of a piston 32 disposed in a cylinder 33 formed in the support block 28. The piston 32 and cylinder 33 are preferably of relatively large diameter in order to avoid the need for a high pressure fluid source for operating the piston 32 so as to obtain the desired tilting forces.

The pivot structure 30, which is also only schematically shown in FIG. 2 as being a rolling ball, consists preferably of a universal joint 34 and a lateral bearing structure 35, the arrangement being shown more clearly in FIG. 4. The universal joint 34 has a housing portion 36 associated with the adjacent roller caster 24 and a housing portion 37 slidably supported by the adjacent support block 28 with a joint member disposed between the two housing portions 36 and 37. The lateral bearing structure 35 may consist of needle rollers, or it may be a friction-type bearing or it may be a hydraulic bearing. The support block 28 and the housing portion 37 are V-shaped so as to cause self-centering of the pivot structure 30 on the support block 28. The roller caster 25 has preferably a housing having front and rear wall sections 38 and 39 and side walls 40, with the transmission rollers 26 and 27 mounted within the housing. Preferably the sun roller 20 is wider than the traction ring 21 so as to provide essentially the same specific contact pressures at the sun roller's traction surface 23 and the traction ring's inner surface 22. Also, the radially inner roller 26 may be wider than the outer roller 27. To adapt for any greater width of the inner roller 26, the caster housing 25 has a projection 41 adjacent the inner roller 26. The transmission rollers 26 and 27 also have circumferential grooves 42 and 43 adapted to receive lubricant squeezed from the contact areas of the rollers 26, 27 with the traction surfaces 22 and 23 during operation of the transmission.

OPERATION OF THE TRACTION ROLLER TRANSMISSION

Rotation of the input shaft 14 and the sun roller 20 in a direction as indicated by arrow 50 (FIGS. 2, 3) applies a force F1 (FIG. 3) to the roller 26 whenever a torque is transmitted. Roller 26 rotating in the direction of arrow 51 drives roller 27 to rotate in the direction of arrow 52 and roller 27 drives the traction ring 21 in the direction of arrow 53 while a reaction force F2 is applied by the traction ring 21 to the outer roller 27. The two spaced forces F1 and F2 which are essentially oppositely directed and of the same size generate a torque tending to tilt the transmission roller casters about their pivot structure 30 so as to reduce the size of the angle α which action forces the transmission rollers into firm frictional engagement with each other and with the sun roller 20 and the traction ring 21. The greater the torque transmitted through the transmission, the greater are the forces F1 and F2 and the greater is the frictional engagement of the transmission rollers with the sun roller and the traction ring.

Both, the sun roller 20 and the traction ring 21, are rotating in the same direction and, with respect to the movement of their traction surfaces 23 and 22, the pivot structures 30 are disposed in front of the roller casters 24 so that the roller casters 24 are trailing their pivot support with regard to the movement of the sun roller surface 23 as well as the traction ring's surface 22. The transmission rollers 26 and 27 will, therefore, automatically align themselves perfectly with the axes of the sun roller and the traction ring thereby avoiding spin and wear in the contact areas of the transmission rollers 26 and 27 with the sun roller 20 and the traction ring 21.

The arrangement described permits the transmission of large forces in a relatively small housing with the output shaft rotating in the same direction as the input shaft.

A particular transmission designed for the jet drives of a surface effect ship has, for example, the capability to transmit 11520 hp. with a traction ring diameter of 42 inches and a sun roller diameter of 22 inches at a traction ring speed of 975 rpm and a sun roller speed about twice the traction ring speed.

The invention is, of course, not limited to the embodiments described herein. The inner and outer traction rollers may, for example, be of different diameters, i.e. the outer traction roller 27 might have a smaller diameter than the inner traction roller 26. Also, as presented in the description the transmission is a speed reduction transmission. The transmission may however, just as well be a speed-up transmission wherein the shaft associated with the traction ring is the input shaft and the shaft associated with the sun roller is the output shaft. Both, sun roller and traction ring would then have to rotate in a direction opposite to that indicated by the arrows 50 and 53.

What is claimed is:

1. In a traction roller transmission comprising: coaxial input and output shafts; a traction ring mounted on one of said shafts; a sun roller mounted on the other shaft and disposed centrally within said traction ring such that an annular space is formed between said sun roller and said traction ring; and motion transmitting traction roller structures disposed in said annular space and in frictional engagement with said sun roller and said traction ring; the improvement that said traction roller structures consist of roller casters each having two parallel traction rollers rotatably supported thereon and in frictional engagement with each other and one of said traction rollers being in engagement with said traction ring and the other with said sun roller, the combined diameters of said traction rollers in each caster being slightly larger than the radial gap between the sun roller and the traction ring such that the axes of the traction roller of each caster are disposed in a first plane which is slightly tilted with respect to a second plane receiving the axis of the sun roller and traction ring and the axis of one of the respective traction rollers, each said first plane being tilted forwardly in the direction of movement of, and adjacent, the driven one of said sun roller and said traction ring, and a ball-type pivotal support structure for each caster arranged, with respect to the movement of the casters relative to the sun roller and traction ring, in front of each caster permitting the traction rollers to freely swing in any direction, also in parallel alignment with the axis of the sun roller in a plane normal to a radius of the sun roller and the traction ring and permitting the caster to tilt in a plane normal to the axis of the sun roller such that a torque transmitted through the transmission forces the traction rollers of said casters into firm engagement with each other and with the traction ring and the sun roller.

2. A traction roller transmission as recited in claim 1, wherein said transmission includes a housing and said pivotal support structure includes blocks mounted on said housing and projecting into said annular space in front of each roller caster.

3. A traction roller transmission as recited in claim 2, wherein said pivotal support structure is a pivot ball support disposed centrally in front of each roller caster.

4. A traction roller transmission as recited in claim 2, wherein said pivotal support structure includes a universal joint structure supported by said support block so as to permit translatory radial movement of the universal joint structure relative to said support block.

5. A traction roller transmission as recited in claim 4, wherein said universal joint structure and said support block have corresponding support surfaces of V-shaped cross-section for centering the universal joint structure and the roller caster in said annular space.

6. A traction roller transmission as recited in claim 2, wherein said pivotal support structure is near the radial inner end of said housing block and at one side thereof for pivotally supporting the caster adjacent said one side and a caster abutment structure is disposed near the radial outer end of said housing block and at its other side for abutment by the caster adjacent said other side.

7. A traction roller transmission as recited in claim 6, wherein said caster abutment structure includes means for tilting the abutting caster so as to force its traction rollers into engagement with said sun roller and said traction ring.

8. A traction roller transmission as recited in claim 7, wherein said means for tilting the abutting caster is a hydraulicly operated piston disposed in a cylinder formed in said housing block.

* * * * *